J. H. MITCHELL.
CRACKER-MACHINE.

No. 181,862. Patented Sept. 5, 1876.

Attest:
John H. Dale
Saml M. Stuving

Inventor:
J. Henry Mitchell

UNITED STATES PATENT OFFICE.

J. HENRY MITCHELL, OF PHILADELPHIA, PENNSYLVANIA.

IMPROVEMENT IN CRACKER-MACHINES.

Specification forming part of Letters Patent No. 181,862, dated September 5, 1876; application filed July 11, 1876.

*To all whom it may concern:*

Be it known that I, J. HENRY MITCHELL, of the city and county of Philadelphia, and State of Pennsylvania, have invented new and useful Improvements in a Plastic Cutting and Forming Machine, which improvements are fully set forth in the following specification, reference being had to the accompanying drawings.

The object of my invention is to cut and form plastic materials into any shape with rapidity—such as crackers, lozenges, &c.—by passing the material under a number of cutters fixed to an oscillating bar or frame, which cuts the crackers, &c., into the desired shapes, and carries them over to the opposite side, and deposits them on an endless apron that conveys them away.

Figure 1:
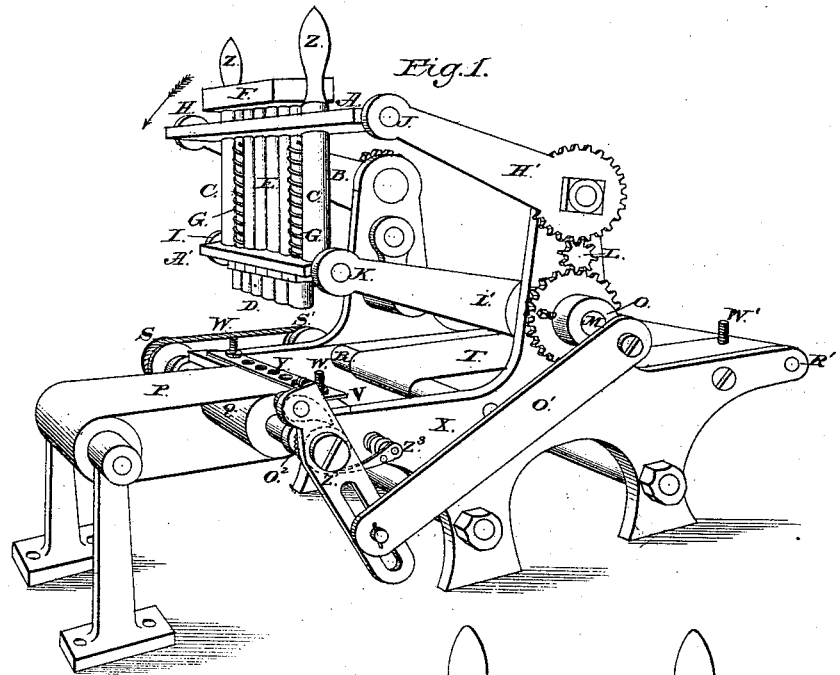

The movement of the oscillating frame operates the feed, as shown in the perspective view, Figure 1, of the accompanying drawings.

Figure 2:
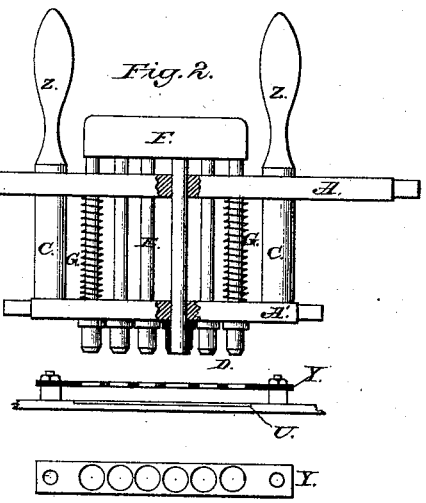
Figure 3:
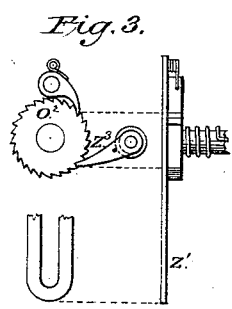
Figure 4:
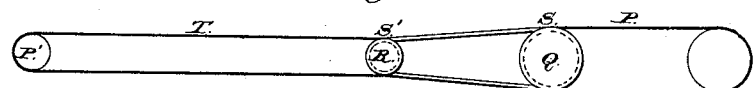

The machine is illustrated more in detail in elevation views Figs. 2, 3, and 4, in which it has not been thought necessary to show the driving mechanism.

The cutter-frame is made with two bars, A A'. The lower one is shorter than the other, so as to pass between the two arms B H', that hold the upper bar A, and they are held together by stud-bolts C C, or otherwise. To the lower bar A' the cutters D are attached. The upper bar A is perforated with holes, through which the plungers or stamps E pass, and are guided so as to press the material in the hollow cutters D after they are cut, and afterward to eject them from cutters. The plungers or stamps E are secured to a weight, F, and are held up to their proper position by springs G, or otherwise. The cutter-frame bars A A' are pivoted to the ends of oscillating arms H H' I I' at J K, which are so arranged as to keep the cutters and frame always in a vertical position, and the motion is communicated from one geared arm to the other by an intermediate gear, L. A shaft, M, passes across the machine, at each end of which is secured oscillating arms $i$ $i'$. On one end of said shaft M crank O is attached for operating feed through connecting-rod $O^1$ and ratchet $O^2$, that communicate motion to endless apron P, which supplies the material to the cutters D by revolving the roller Q, Figs. 1 and 2, over which apron P passes. This roller is connected with a discharging-roller, R, by means of gearing; or, as in the drawing, with cord-wheels R R', intended to convey the material away after it has been worked into the desired shapes.

The cutting-bed U, Fig. 2, is made of suitable material, that will not dull cutters, and can be replaced when too much worn. On one side of the cutting-bed, between it and discharge-roller R, is an opening, V, into which cuttings pass, and fall into a receptacle placed below for them. The cutters D are prevented from striking the cutting-bed U too hard by placing stops W W on frame X. The stops bear on the lower bars A' of the cutter-frame, and corresponding stops W' are also fastened to frame X on the discharging side for the same purpose. In connection with the cutter-bed is a stripper-plate, Y, Figs. 1 and 2, through which the cutters D pass. This plate prevents all superfluous material from being carried over with cutters. It is also adjustable to a height to suit the thickness of material being used.

The operation is as follows: The machine may be worked by power; but the drawing represents a hand-machine. By placing material on endless apron P, and moving the handles Z (which are attached to cutter-head frame) in the direction of arrow with considerable force the cutters are brought in contact with the material, thereby cutting it into the desired shapes. This movement having imparted considerable momentum to the weight F attached to the plungers or stamps E, causes them to overcome the tension of springs G, and to descend upon the material inside of cutters D, stamping any desired figure or shape upon it. Then, by reversing rapidly, the cutters are brought to the opposite side of the machine, down upon the stops W'. This movement causes the plungers or stamps E again to descend by the motion of the weight F, thereby forcing the shaped material out of the cutters D upon the endless belt or apron T, leaving the surplus material underneath stripper-plate Y, whence the movement of the ratchet-feed causes it to pass into the opening V. Now, it will be readily seen that when the cutters are carrying the shaped material to deposit it upon the discharging-apron T the oscillating motion turns the gears on arms H' and pinion L, and operates the feed-motion, as above described. The feed can be increased or diminished by moving the connecting-rod $O^1$ to a different part of the slotted arm $Z^1$ of the ratchet $O^2$. The retrograde motion of ratchet motion is prevented by means of a pawl, $Z^3$, attached to frame X, working in ratchet.

I claim as my invention—

1. The combination of the geared oscillating arms H H' and intermediate pinion, L for the purpose of keeping cutter-frame always in a vertical position, as herein described.

2. The weight F, in combination with plungers or stamps E, accumulating momentum to be used in shaping and ejecting the material from the cutters D.

J. HENRY MITCHELL.

Witnesses:
JOHN H. DALE,
SAML. M. SKIRVING.